United States Patent
Chen et al.

(10) Patent No.: US 9,246,745 B2
(45) Date of Patent: Jan. 26, 2016

(54) MAC ADDRESS MANAGEMENT METHOD

(75) Inventors: Wei-Pin Chen, Taipei (TW); Hung-Chi Huang, Taipei (TW); Ming-Chao Chung, Taipei (TW); Chun-Cheng Wang, Taipei (TW)

(73) Assignee: VIA TECHNOLOGIES, INC., New Taipei (TW)

( * ) Notice: Subject to any disclaimer, the term of this patent is extended or adjusted under 35 U.S.C. 154(b) by 1572 days.

(21) Appl. No.: 11/610,830

(22) Filed: Dec. 14, 2006

(65) Prior Publication Data
US 2007/0280263 A1 Dec. 6, 2007

(30) Foreign Application Priority Data
Jun. 1, 2006 (TW) ............................... 95119379 A

(51) Int. Cl.
G06F 17/30 (2006.01)
H04L 29/12 (2006.01)

(52) U.S. Cl.
CPC ...... *H04L 29/12839* (2013.01); *H04L 61/6022* (2013.01); *H04L 29/12009* (2013.01); *H04L 61/2084* (2013.01)

(58) Field of Classification Search
CPC ............ H04L 29/12839; H04L 63/608; H04L 61/6022; H04L 63/10
USPC .......... 707/673, 696, 711, 741–747; 370/389, 370/392, 401, 254, 352, 329, 338; 713/153; 726/13; 435/287.2
See application file for complete search history.

(56) References Cited

U.S. PATENT DOCUMENTS

| | | | |
|---|---|---|---|
| 6,178,414 B1* | 1/2001 | Beckmann et al. | |
| 6,272,672 B1* | 8/2001 | Conway | G06F 9/4445 717/107 |
| 6,546,391 B1* | 4/2003 | Tsuruoka | |
| 6,668,263 B1* | 12/2003 | Cranston et al. | 707/205 |
| 6,775,278 B1* | 8/2004 | Britton et al. | 370/389 |
| 6,804,233 B1* | 10/2004 | Congdon et al. | 370/389 |
| 6,875,603 B2* | 4/2005 | Sato et al. | 435/287.2 |
| 6,891,840 B2* | 5/2005 | Okada | 370/401 |
| 6,910,118 B2* | 6/2005 | Kagawa | 711/216 |
| 7,274,695 B2* | 9/2007 | Kim et al. | 370/389 |

(Continued)

FOREIGN PATENT DOCUMENTS

CN 1622533 A 6/2005

OTHER PUBLICATIONS

David Bird and Mike Harwood, Network+ Training Guide, Aug. 14, 2002, Exam Cram, ISBN 978-0-7897-2830-2, Chapter 3, Identifying MAC Addresses.*

(Continued)

*Primary Examiner* — Frantz Coby
(74) *Attorney, Agent, or Firm* — McClure, Qualey & Rodack, LLP

(57) ABSTRACT

A method for MAC address management is provided. A MAC address is provided, and capacities of a first column and a second column corresponding to a first index in a MAC table are checked. If the first column and the second column are filled, capacities of a third column and a fourth column corresponding to a second index in the MAC table are checked. If one of the third and fourth columns is empty, the MAC address is written thereto. The second index is successive to the first index. The MAC table further comprises a plurality of time stamp columns, recording idle time of each MAC address.

14 Claims, 8 Drawing Sheets

| | status | time stamp | status | time stamp |
|---|---|---|---|---|
| Index1 | learned(1) 400 | T8 | empty 402 | |
| Index2 | overwrite(2) 404 | T6 | learned(2) 406 | T4 |
| Index3 | learned(2) 408 | T5 | learned(3) 410 | T1 |
| Index4 | learned(3) 412 | T2 | learned(3) 414 | T3 |
| Index5 | learned(4) 416 | T7 | empty 418 | |
| | ⋮ | | ⋮ | |
| | empty | | empty | |

(56) References Cited

U.S. PATENT DOCUMENTS

| | | | |
|---|---|---|---|
| 7,379,459 B2 * | 5/2008 | Ohnishi | 370/392 |
| 7,400,623 B2 * | 7/2008 | Chen | 370/389 |
| 7,554,931 B2 * | 6/2009 | Zhou et al. | 370/254 |
| 7,593,953 B1 * | 9/2009 | Malalur | H04L 29/12009 |
| 7,844,814 B2 * | 11/2010 | Baum | 713/153 |
| 8,086,571 B2 * | 12/2011 | Malalur | H04L 29/12009 707/673 |
| 8,428,064 B2 * | 4/2013 | Mizukoshi | H04L 61/2084 370/329 |
| 2002/0169937 A1 * | 11/2002 | Kagawa | 711/206 |
| 2002/0196761 A1 * | 12/2002 | Kaneko | H04L 29/12009 370/338 |
| 2003/0031190 A1 * | 2/2003 | Ohnishi | 370/401 |
| 2004/0100962 A1 * | 5/2004 | Kim et al. | 370/392 |
| 2004/0205056 A1 * | 10/2004 | Mori et al. | 707/3 |
| 2005/0147113 A1 * | 7/2005 | Brown | 370/428 |
| 2006/0165056 A1 * | 7/2006 | Komaki | 370/352 |
| 2006/0274739 A1 * | 12/2006 | Chen | 370/389 |
| 2007/0121527 A1 * | 5/2007 | Zhou et al. | 370/254 |
| 2008/0092228 A1 * | 4/2008 | Baum | 726/13 |

OTHER PUBLICATIONS

English Language Abstract of CN1622533.

* cited by examiner

| | | |
|---|---|---|
| Index1 | learned(1) 100 | empty 102 |
| | empty 104 | empty 106 |
| Index2 | overwrite(2) 108 | learned(2) 110 |
| | learned(2) 112 | learned(2) 114 |
| Index3 | empty 116 | empty 118 |
| | empty 120 | empty 122 |
| | ⋮ | ⋮ |
| | | |
| | | |

FIG. 1a ( PRIOR ART )

| | | |
|---|---|---|
| Index1 | learned(1) 200 | empty 202 |
| | empty 204 | empty 206 |
| Index2 | overwrite(2) 208 | learned(2) 210 |
| | learned(2) 212 | learned(2) 214 |
| Index3 | empty 216 | empty 218 |
| | empty 220 | empty 222 |
| | ⋮ | ⋮ |
| Indexn | | |
| | | |

FIG. 2b ( PRIOR ART )

|  | status | time stamp | status | time stamp |
|---|---|---|---|---|
| Index1 | learned(1) 400 | T8 | empty 402 | |
| Index2 | overwrite(2) 404 | T6 | learned(2) 406 | T4 |
| Index3 | learned(2) 408 | T5 | learned(3) 410 | T1 |
| Index4 | learned(3) 412 | T2 | learned(3) 414 | T3 |
| Index5 | learned(4) 416 | T7 | empty 418 | |
| ⋮ | ⋮ | ⋮ | ⋮ | |
| | empty | | empty | |

FIG. 4

| IndexA | A | A |
|---|---|---|
| IndexB | A, B | A, B |
| IndexC | A, B, C | A, B, C |
| ⋮ | B, C | B, C |
| ⋮ | C | C |

FIG. 5

MAC ADDRESS MANAGEMENT METHOD

BACKGROUND OF THE INVENTION

1. Column of the Invention

The invention relates to computer networks, and in particular, to media access control (MAC) address management.

2. Description of the Related Art

FIG. 1a shows a conventional MAC table. Conventionally, a typical router or switch establishes a MAC table in the memory to keep track of MAC addresses in streamed packets. A MAC table comprises a plurality of columns, such as first column 100, second column 102, third column 104 and fourth column 106, each capable of storing one MAC address. Addresses of every four columns also serve as indices for rapid access. For example, Index1 is an index for the columns 100, 102, 104 and 106.

FIG. 1b is a flowchart of a method for conventional MAC address management. If 2048 columns are provided in a memory block, 512 indices are therefore available each corresponding to four columns. In step S102, when a packet is received, the MAC address thereof is calculated according to a hash algorithm to obtain a corresponding index. Alternatively, the index may be directly obtained from the last 9 bits of the MAC address. In step S104, the MAC table is consulted to determine whether the MAC address is already stored in the corresponding four columns. If not, a learning procedure is processed in step S108 to update the MAC table with the MAC address. Conventionally, there exists an expiration time limit in every MAC address if there is no access to a MAC address for a period of time, and the MAC table eliminates the expired MAC address automatically. If the MAC address is already stored in a corresponding one of the four columns, the access time of the MAC address is updated to keep it from expiration in step S106.

FIG. 2a is a flowchart of a learning procedure for conventional MAC address. The procedure includes the following steps. In step S202, the corresponding four columns of the MAC table are checked according to the index generated by the MAC address. In step S204, it is individually checked whether the capacities of one of the four columns are available for the MAC address. If one of the columns is available, the MAC address is stored thereto in step S206. If all four columns are filled, one of the columns is overwritten in step S208. The principle for overwrite is that selecting a column to be overwritten if the expiration time limit of a column is almost reached. Alternatively, the four columns may be overwritten in turn or at random.

FIG. 2b shows a conventional MAC table. Index1, Index2 and Index3 each correspond to four columns. Among the columns with Index1, column 200 stores a MAC address (marked as learned), and the other three are empty. Columns 208, 210, 212 and 214 of Index2 are filled with MAC addresses (learned). When a new MAC address corresponding to Index2 is provided, the column 208 is overwritten. Therefore, the four columns corresponding to Index3 are empty.

Using indices to access the MAC addresses is convenient; however, the utilization of memory is not efficient. For example, overwrite is required if all columns with Index2 are filled with MAC addresses and one more MAC address of Index2 is provided. In fact, there are still a lot of free memory spaces such as columns with Index3. An enhancement is desirable to efficiently use all available memory resources.

BRIEF SUMMARY OF INVENTION

An exemplary embodiment provides a method for MAC address management. A MAC address is provided and the method includes the following steps. First, capacities of a first column and a second column corresponding to a first index in a MAC table are checked. Next, capacities of a third column and a fourth column corresponding to a second index in the MAC table is checked when capacities of the first column and the second column are filled with MAC addresses. Finally, a MAC address is stored into one of the capacities of the third column and the fourth column if one of the third and fourth columns is empty, wherein the second index is successive to the first index.

Another method is provided according to the present invention. The method includes the following steps. First, a MAC table is provided, and includes a plurality of consecutive columns for storage of MAC addresses and a plurality of consecutive indices each associated with at least two columns. Next, a packet with a MAC address is received. Sequentially, the MAC table is checked to determine whether the MAC address already exists in the MAC table. Finally, a learning procedure is performed to record the MAC address in the MAC table if the MAC address does not exist in the MAC table, wherein the learning procedure includes the steps of deriving a first index by the MAC address, checking capacities of columns corresponding to the first index, checking capacities of columns corresponding to the second index if the columns corresponding to the first index are filled, and writing the MAC address into one of the columns corresponding to the second index if one of the columns corresponding to the second index is empty.

A detailed description is given in the following embodiments with reference to the accompanying drawings.

BRIEF DESCRIPTION OF DRAWINGS

The invention can be more fully understood by reading the subsequent detailed description and examples with references made to the accompanying drawings, wherein:

FIG. 1a shows a conventional MAC table;

FIG. 2b is another conventional MAC table;

FIG. 4 shows an embodiment of MAC address management; and

FIG. 5 shows another embodiment of the MAC address management.

DETAILED DESCRIPTION OF INVENTION

The following description is of the best-contemplated mode of carrying out the invention. This description is made for the purpose of illustrating the general principles of the invention and should not be taken in a limiting sense. The scope of the invention is best determined by reference to the appended claims.

Figure 3A:
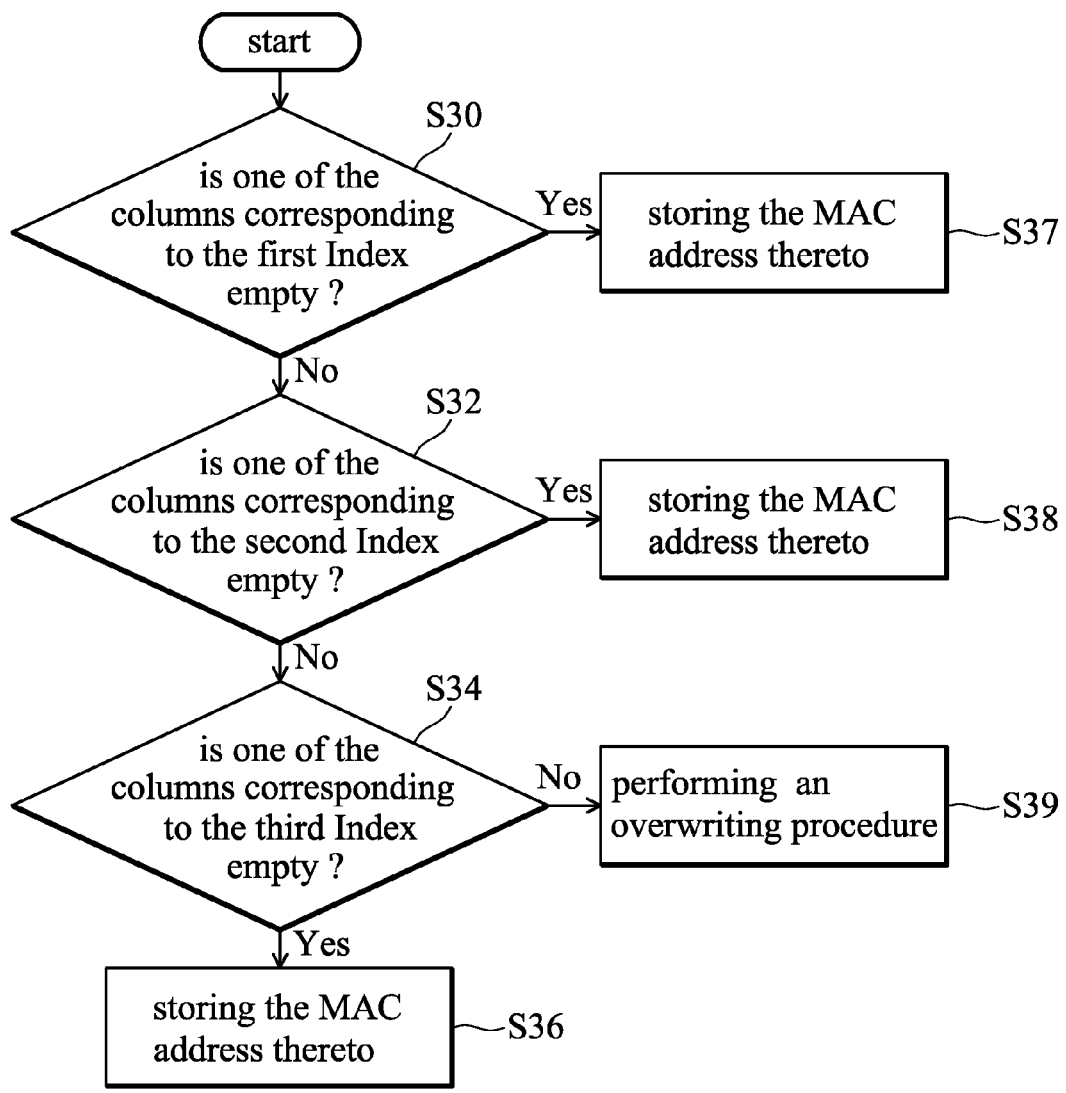
FIG. 3a is a flowchart of a learning procedure for a MAC address according to an embodiment of the invention.

FIG. 3a is a flowchart of a learning procedure for a MAC address according to an embodiment of the invention. In step S30, when a packet is received, the MAC address therein is converted to obtain a first Index according to a hash algorithm, wherein the first Index is associated with the first and second columns. The MAC table is checked for that whether the first and second columns are available. In step S32, if both the first and second columns are fully filled, capacities of the successive third and fourth columns are checked, wherein the third and fourth columns correspond to a second Index. Likewise, in step S34, if the third and fourth columns are filled, capacities of the successive fifth and sixth columns are checked, wherein the fifth and sixth columns correspond to a third Index. In step S36, if one of the fifth and sixth columns is empty, the MAC address is written thereto. Otherwise, if the fifth and sixth columns are still unavailable for the MAC address, an overwrite procedure is performed in step S39, and one of the first to sixth columns is selected to store the MAC address. Each column comprises a time stamp, which is expiration time limit, to record the idle time of each MAC addresses. The overwrite order may depend on the time stamp by turns, or at random. In step S37, if one of the first and second columns is deemed available in step S30, the MAC address is written thereto. Likewise in step 38, the third and fourth columns are used if they are deemed available in step S32. If the MAC address already exists in the MAC table, the time stamp thereof is updated.

Figure 3B:
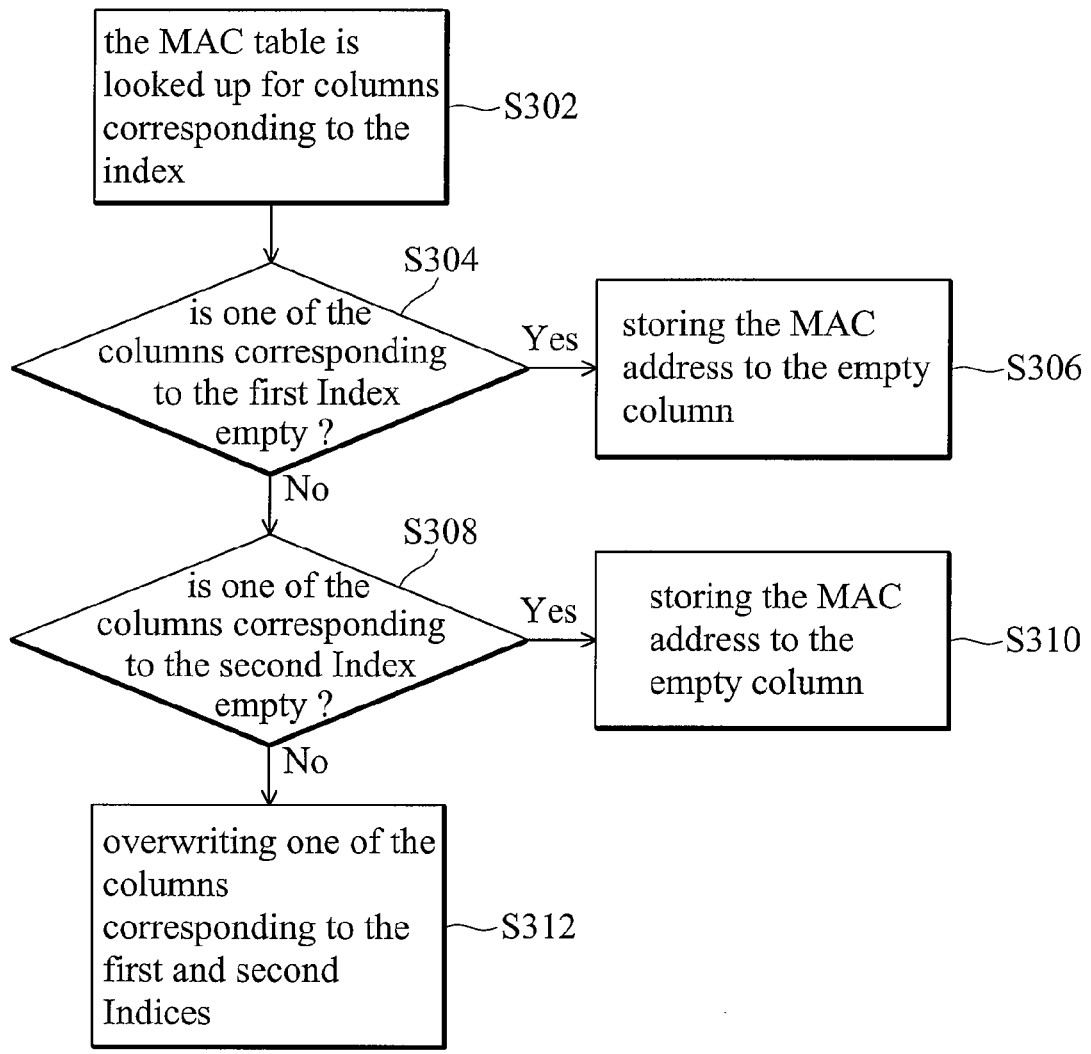
FIG. 3b is another flowchart of a learning procedure for a MAC address according to an embodiment of the invention.

FIG. 3b is another flowchart of a learning procedure for the MAC address. According to the embodiment, when the columns corresponding to an index are unavailable, the successive columns corresponding to the next index are borrowed to store the MAC address. In this way, the chance of overwrite is reduced, and the usage of the free storage spaces in the memory increases. In step S302, an index is generated according to the MAC address, and the MAC table is consulted for columns corresponding to the index. However, the index in the embodiment may have two, four or six columns. And then, in step S304, capacities of the columns are individually checked. If one of the columns is available, the MAC address is stored thereto in step S306. On the contrary, if all columns of the origin index are fully filled, columns with the next index are allocated in step S308. Likewise, if one of the columns with the next index is available, the MAC address is written thereto in step S310. In step 312, if columns with the next index are all unavailable, an overwrite procedure is performed. In the overwrite procedure, the MAC address can be written into columns checked in step S304. Alternatively, columns checked in step S308 can also be used for overwrite. While columns with a successive index are allocated, a further successive index next to the successive index may be borrowed if all columns are unavailable in step S308.

Figure 1B:
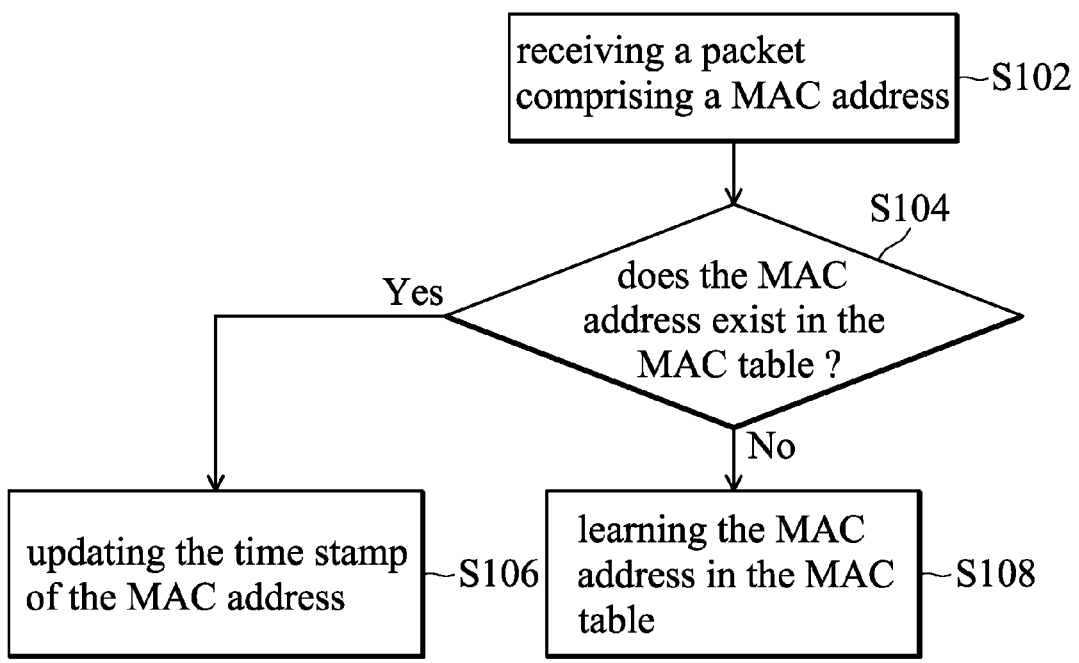
FIG. 1b is a flowchart of a method for conventional MAC address management.
Figure 2A:
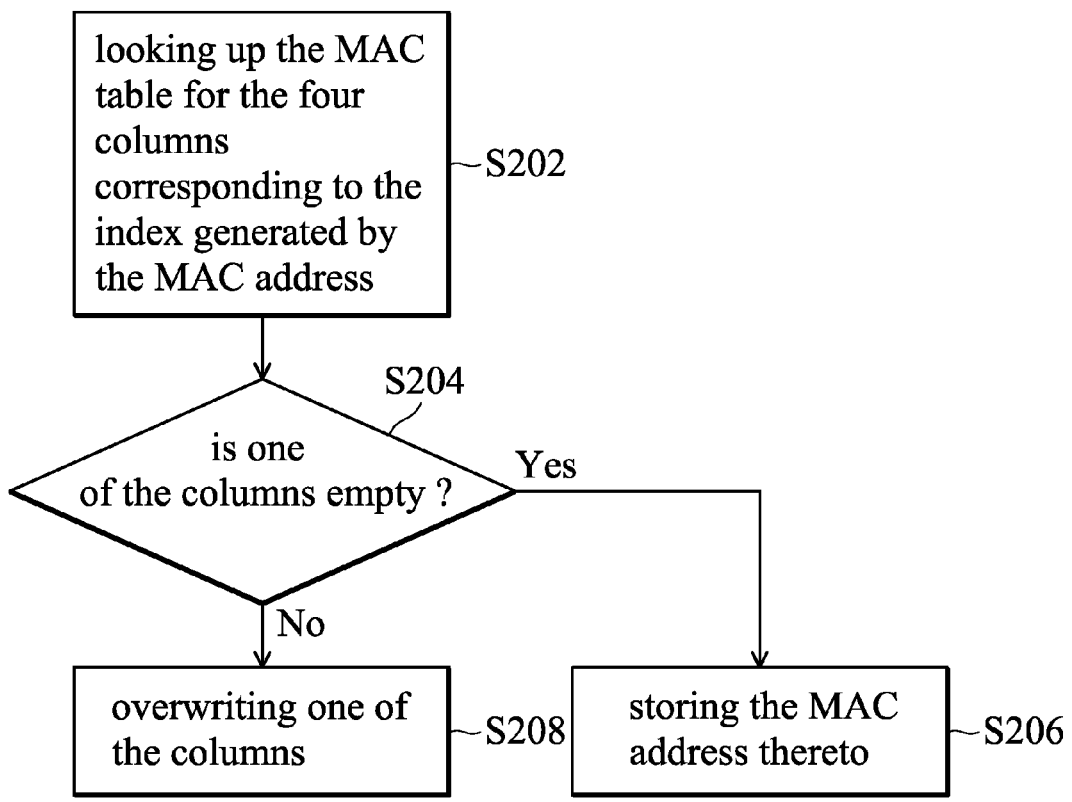
FIG. 2a is a flowchart of a learning procedure for a conventional MAC address.

FIG. 4 shows an embodiment of a MAC table. Each index has two columns, and each column is embedded with a time stamp (the timing is represented as T1, T2 ... etc). The time stamp records an update time of each column for calculating the idle time that serves as a judgment basis of MAC address replacement. The conventional method for management of the time stamp is well-known, thus detail descriptions are not disclosed in the present invention. In FIG. 4, the columns with Index1 are shown, and a column 400 of Index1 is filled (learned) and a column 402 of Index1 is empty. If a MAC address will be stored into one of columns with Index2 and columns with Index2, 404 and 406 are fully filled, the column 408 in Index3 is borrowed for storage (marked as learned (2)). If the columns 404, 406, 408 and 410 are all filled, and another MAC address will be stored into one of columns with Index2, column 404 is overwritten (marked as overwrite(2)). Since columns with each success index next to the original index can be borrowed, the usage of the free storage spaces in the memory increases. As the access storage spaces of a MAC address are expanded, the free storage spaces in the memory increases. Besides, the MAC address may be stored in one of the columns with different indexes, and the method for looking up MAC table as described in step S1104 of FIG. 1b will be modified. Basically, indexes are typically formed with corresponding memory addresses of specific columns in the memory, and the indexes are consecutive in the memory. Thus, when a MAC address will be stored in a column with a specific index in step S104, more columns with successive indexes next to the specific index are allocated.

FIG. 5 shows another embodiment of a MAC table. For example, columns with IndexC may be borrowed to store a MAC address that originally will be stored in one of columns with IndexA. Columns, which are suitable to store the MAC address that originally will be stored in one of columns with IndexA, are marked A. Likewise, columns, which are suitable to store the MAC address that originally will be stored in one of columns of IndexB, are marked B. As a result, the columns with IndexC are marked as A, B, and C. Since MAC addresses are stored in a new way, the way to consult the MAC table should be adjusted respectively. For example, all columns with IndexA, IndexB and IndexC should be consulted for a MAC address that originally will be stored in one of columns with IndexA. Furthermore, the derivation of index may be obtained from the last 10 bits of the MAC address, and a 10-bit value is generated from the MAC address according to a hash algorithm.

While the invention has been described by way of example and in terms of preferred embodiment, it is to be understood that the invention is not limited thereto. To the contrary, it is intended to cover various modifications and similar arrangements (as would be apparent to those skilled in the art). Therefore, the scope of the appended claims should be accorded the broadest interpretation so as to encompass all such modifications and similar arrangements.

What is claimed is:

1. A method for MAC (Media Access Control) address management executed by a router comprising a MAC table, comprising: performing, by the router, a learning procedure to record said MAC address in said MAC table if said MAC address does not exist in said MAC table; wherein said learning procedure comprises: performing, by the router, a first checking to determine capacities of a first column and a second column in the MAC table, wherein the first and second columns correspond to a first index; performing, by the router, a second checking to determine capacities of a third column and a fourth column in said MAC table when capacities of said first column and said second column are filled with MAC addresses, wherein the third and fourth columns correspond to a second index; and storing, by the router, a MAC address into one of said third column and said fourth column if one of said third and fourth columns has available capacity, wherein said second index is successive to said first index, wherein said MAC table further comprises a plurality of time stamp columns for recording idle time of each MAC address; and updating, by the router, idle time of said MAC address if said MAC address already exists in the MAC table.

2. The method as claimed in claim 1, further comprising storing, by the router, said MAC address into one of the capacities of said first column and said second column if one of said first and second columns is empty.

3. The method as claimed in claim 1, further comprising performing, by the router, an overwrite procedure to write said MAC address into one of the first, second, third and fourth columns if one of the capacities of said third column and said fourth column are filled with MAC addresses.

4. The method as claimed in claim 1, further comprising:
performing, by the router, a third checking to determine capacities of a fifth column and a sixth column in said MAC table when capacities of said third column and said fourth column are filled with MAC addresses, wherein the fifth and sixth columns correspond to a third index; and storing, by the router, a MAC address into one of the capacities of said fifth column and said sixth column if one of said fifth and sixth columns has available capacity; wherein said third index is successive to said second index.

5. A method for MAC (Media Access Control) address management executed by a router comprising a MAC table, comprising: providing, by the router, the MAC table, comprising: a plurality of consecutive columns for storage of MAC addresses; and a plurality of consecutive indices each associated with at least two columns; receiving, by the router, a packet comprising a MAC address; checking, by the router, said MAC table to determine whether said MAC address already exists in said MAC table; and performing, by the router, a learning procedure to record said MAC address in said MAC table if said MAC address does not exist in said MAC table; wherein said learning procedure comprises: deriving, by the router, a first index by said MAC address; performing, by the router, a first checking to determine capacities of columns corresponding to said first index; performing, by the router, a second checking to determine capacities of columns corresponding to a second index successive to the first index if the columns corresponding to said first index are filled; and writing, by the router, said MAC address into one of the columns corresponding to said second index if one of the columns corresponding to said second index has available capacity, wherein said MAC table further comprises a plurality of time stamp columns for recording idle time of each MAC address; and updating, by the router, idle time of said MAC address if said MAC address already exists in said MAC table.

6. The method as claimed in claim 5, wherein said learning procedure further comprises writing, by the router, said MAC address into one of the columns corresponding to said first index if one of the columns corresponding to the first index is empty.

7. The method as claimed in claim 5, wherein said learning procedure further comprises performing, by the router, an overwrite procedure to write said MAC address into one of the columns corresponding to said first and second indices if all columns corresponding to said second index are filled.

8. The method as claimed in claim 7, further comprising checking, by the router, whether said MAC address exists in the columns corresponding to said first and second indices.

9. The method as claimed in claim 5, wherein said learning procedure further comprises:

performing, by the router, a third checking to determine capacities of columns corresponding to a third index successive to said second index if all columns corresponding to said second index are filled; and writing, by the router, said MAC address into one of the columns corresponding to said third index if one of the columns corresponding to said third index has available capacity.

10. The method as claimed in claim 9, further comprising checking, by the router, whether said MAC address already exists in one of the columns corresponding to said first, second and third indices.

11. The method as claimed in claim 5, further comprising converting, by the router, the last 10 bits of said MAC address to generate said first index by a hash algorithm.

12. The method as claimed in claim 4, further comprising performing, by the router, an overwrite procedure to write said MAC address into one of the first, second, third, fourth, fifth, and sixth columns if all columns corresponding to said first, second and third indices are filled.

13. The method as claimed in claim 9, further comprising performing, by the router, an overwrite procedure to write said MAC address into one of the first, second, third, fourth, fifth, and sixth columns if all columns corresponding to said first, second and third indices are filled.

14. A method for MAC (Media Access Control) address management executed by a router comprising a MAC table, comprising: providing, by the router, the MAC table, comprising: a plurality of consecutive columns for storage of MAC addresses; a plurality of consecutive indices each associated with at least two columns; and a plurality of time stamp for recording idle time of each MAC address; receiving, by the router, a packet comprising a MAC address; checking, by the router, said MAC table to determine whether said MAC address already exists in said MAC table; and performing, by the router, a learning procedure to record said MAC address in said MAC table if said MAC address does not exist in said MAC table; wherein said learning procedure comprises: deriving, by the router, a first index by said MAC address; performing, by the router, a first checking to determine capacities of columns corresponding to said first index; performing, by the router, a second checking to determine capacities of columns corresponding to a second index successive to the first index if the columns corresponding to said first index are filled; and writing, by the router, said MAC address into one of the columns corresponding to said second index if one of the columns corresponding to said second index has available capacity; and wherein said MAC table further comprises a plurality of time stamp columns for recording idle time of each MAC address; and updating, by the router, idle time of said MAC address if said MAC address already exists in said MAC table.

* * * * *